United States Patent [19]
Jackson

[11] 3,934,813
[45] Jan. 27, 1976

[54] CONCRETE PUMP VALVE

[75] Inventor: Robert E. Jackson, Newport Beach, Calif.

[73] Assignee: Challenge-Cook Bros., Incorporated, Industry, Calif.

[22] Filed: May 14, 1973

[21] Appl. No.: 359,706

[52] U.S. Cl. ................ 251/62; 277/147; 138/94.3; 251/157; 251/190
[51] Int. Cl.² ...................................... F16K 31/163
[58] Field of Search ............ 251/14, 62, 63.5, 63.6, 251/214, 157, 190; 277/142, 180, 166, 138, 147; 417/900; 138/94.3; 285/337, 348, 363, 368, 374, 336, 31

[56] References Cited
UNITED STATES PATENTS

| | | | |
|---|---|---|---|
| 807,739 | 12/1905 | Hanson | 285/337 |
| 940,098 | 11/1909 | Wehrle | 285/336 X |
| 1,545,696 | 7/1925 | Riley | 251/14 X |
| 1,671,161 | 5/1928 | Perks | 285/337 X |
| 1,681,381 | 8/1928 | Tolman | 285/31 |
| 1,964,044 | 6/1934 | Engel | 285/337 X |
| 1,980,335 | 11/1934 | Hewitt et al. | 277/180 |
| 2,650,839 | 9/1953 | Newell | 285/374 X |
| 2,733,041 | 1/1956 | Crookston | 251/14 |
| 3,420,259 | 1/1969 | Dargitz | 137/315 X |
| 3,524,620 | 8/1970 | Gallagher | 251/63.5 X |
| 3,529,804 | 9/1970 | Perrin | 251/63.5 |
| 3,659,970 | 5/1972 | McElroy | 417/900 X |

FOREIGN PATENTS OR APPLICATIONS

| 233,488 | 5/1925 | United Kingdom | 285/363 |

*Primary Examiner*—Henry T. Klinksiek
*Attorney, Agent, or Firm*—Lyon & Lyon

[57] ABSTRACT

A valve for a concrete pump having a front valve closing portion which in the closed position prevents flow through a T-pipe section, a supporting structure secured to the T-pipe section and an annular sealing band carried by the supporting structure and positioned about the valve closing portion.

27 Claims, 7 Drawing Figures

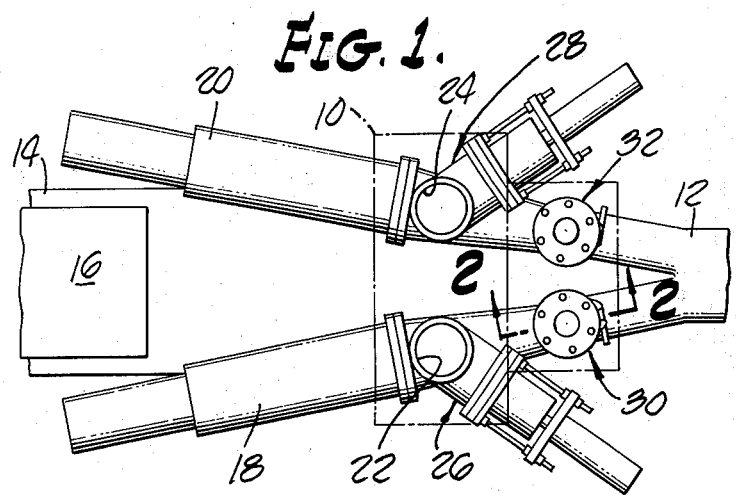
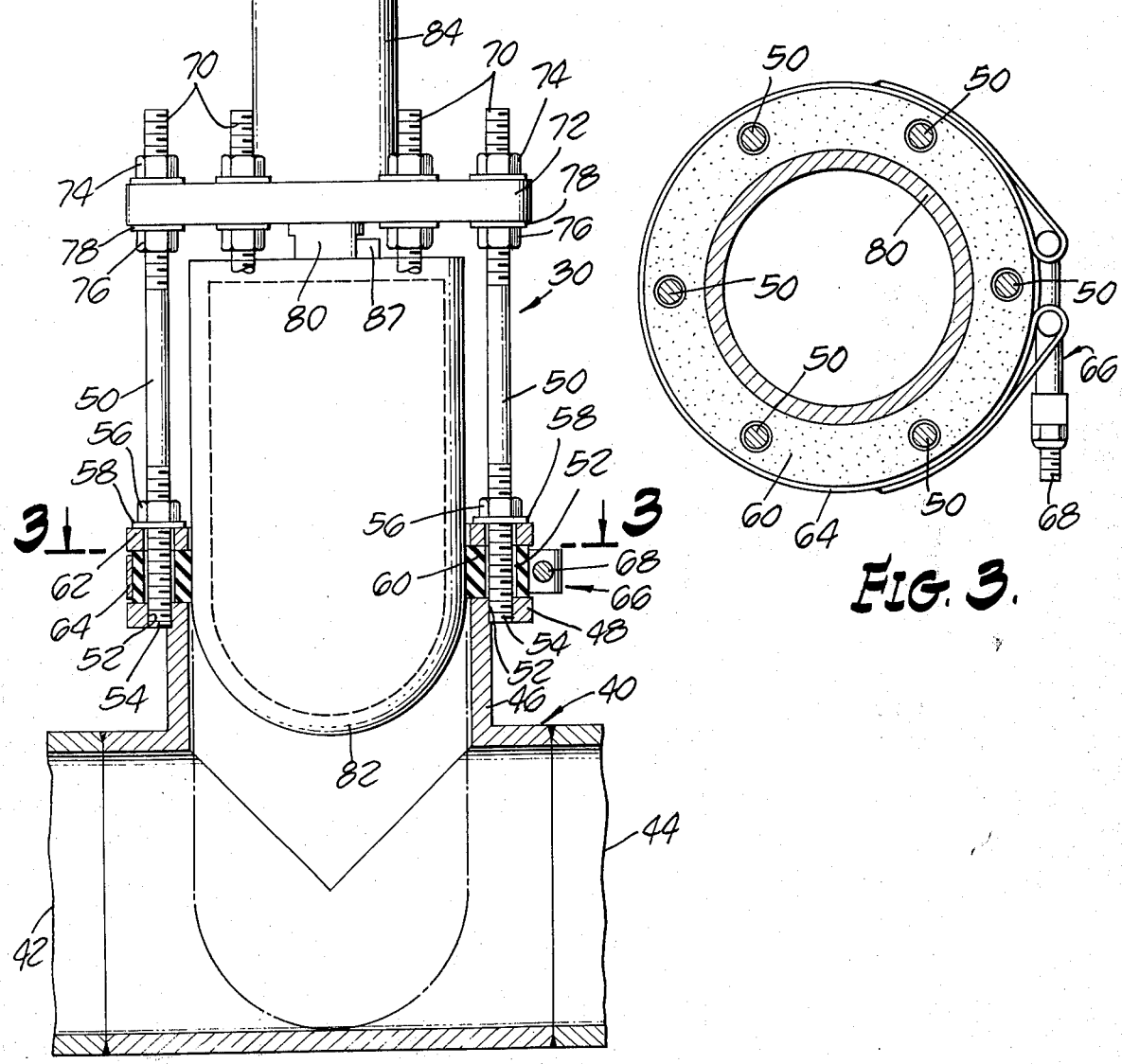

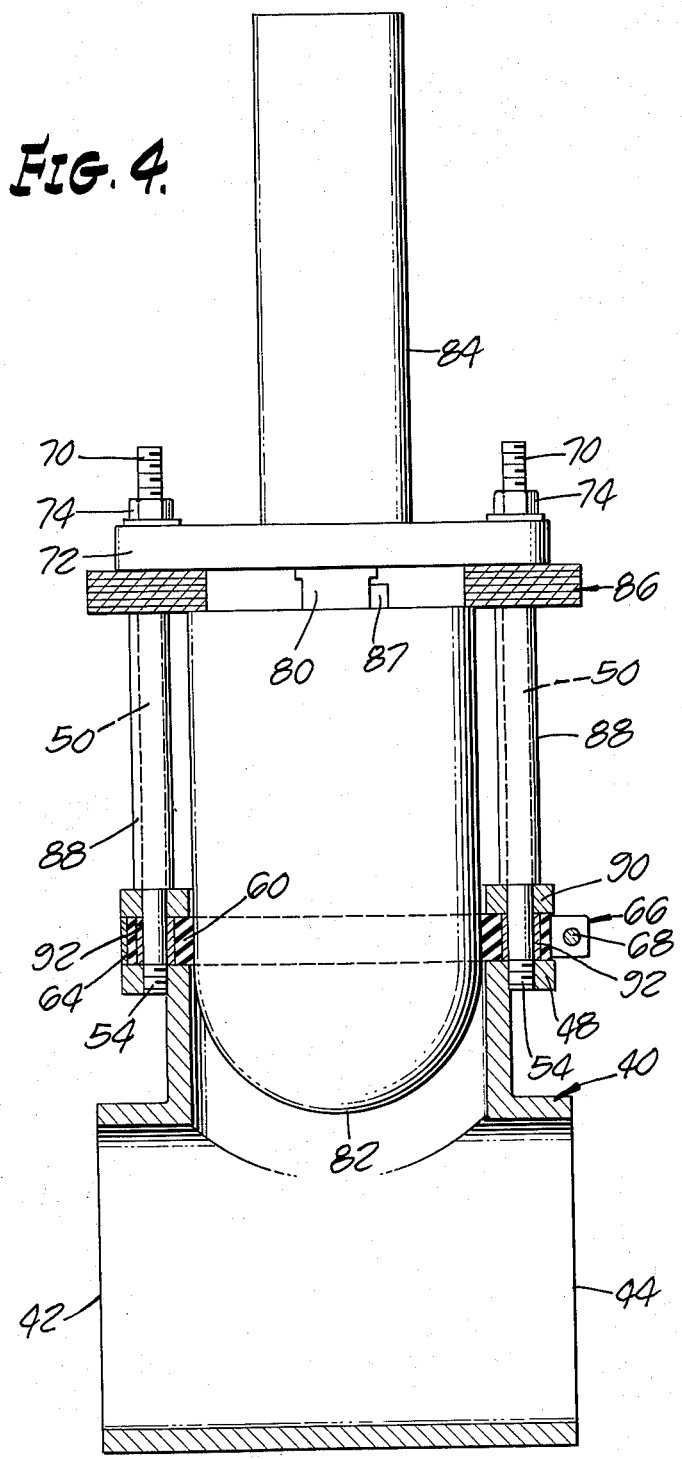

CONCRETE PUMP VALVE

BACKGROUND OF THE INVENTION

The concrete pumps commonly used in modern building construction are of the ram piston type, an example of which is shown in U.S. Pat. No. 3,327,641. Such pumps utilize rams whose ram cylinders are filled with concrete from a hopper during the back stroke, and during the forward stroke, push the concrete into a pipeline which leads to the form. Typically, a pair of rams is utilized, one moving rearward and taking in concrete, while the other moves forward to pump the concrete into the pipeline. Each ram requires a pair of valves for its operation. One is the hopper valve which leads to the hopper. It is open when concrete is flowing from the hopper to the ram cylinder associated with the particular hopper valve. It closes during the forward stroke of the ram piston to prevent concrete from being pumped back into the hopper. The other valve associated with the one ram is the pipeline valve which is positioned in front of the ram. The pipeline valve is open during the forward stroke of the ram piston to allow the concrete to enter the discharge conduit and is closed during the back stroke to prevent concrete from returning through the pipeline to the ram. Where concrete is pumped to high levels, large pressures are encountered. These high pressures plus the highly abrasive nature of the concrete results in large wear on the valve. The wear is extremely hard on the pipeline valve since it is subjected to large pressures during both its opened and closed positions.

A typical prior art valve such as that shown in U.S. Pat. No. 3,327,641, utilizes the general form of a T-pipe section in series with the pipeline or hopper. The elongated leg of the T served as the valve cylinder and a valve piston moved through this cylinder to open and close the valve. The piston comprised a front bullet-shaped member of rubber, followed by a thick steel rod. The steel rod had a pair of grooves for holding packing glands. In the case of the pipeline valves, the piston was designed so that during the open valve position, when the bullet was within the cylinder, the pumping pressures would expand the rubber. This would prevent the liquid portion of the concrete, generally referred to as sap, from passing by the piston. The packing glands served as a second barrier to sap leakage during the open valve position, and as the primary barrier when the valve was closed.

The aforedescribed valves often failed to work properly after a brief period of difficult pumping conditions. Typically, after a few hundred cubic yards of concrete had been pumped, the piston would "hang" on the cylinder walls, that is, the piston would not move. The pump would have to be stopped and the piston freed. Hanging and erratic performance would continue for the remaining life of the packing, which was only about 1,000 cubic yards of pumped concrete. The valve assembly would then have to be disassembled and new packing installed to prevent excessive sap leakage. After several thousand cubic yards, the rubber bullet was so worn that the entire piston had to be replaced.

The erratic performance and limited life of the packing glands is largely due to their exposure to the concrete sap, which quickly hardens. Many valve pistons have incorporated grease fittings for continually supplying grease to the packing glands. However, the grease fittings do not substantially extend the lifetime or eliminate erratic performance after several hundred cubic yards have been pumped. They have little effect on the wear of the rubber bullet. The erratic performance and need for repeated changes of the packing glands is costly in that it limits production. In addition, the pistons are costly, and their limited life of only several thousand cubic yards of pumped concrete results in high maintenance costs.

One attempt to provide a more trouble-free valve for a concrete pump is found in U.S. Pat. No. 3,529,804. The valve described therein utilizes the standard T-pipe section communicating with a cylinder in conjunction with a front valve closing portion and provides a tapered expander member behind the valve closing portion with a thick cup shaped seal having a large downwardly extending lip portion placed thereover. A pressure plate is placed behind the seal and when wear was found on the periphery of the seal, the pressure plate could be tightened against the seal, expanding the seal and providing a new peripheral sealing area. However, this valve also proved unsatisfactory, as the implementation of the expandable seal with its extending lip portion, designed to distribute the expansion forces to a large area of the seal, has resulted in an extensive dragging of the seal and particularly the large lip portion during the rearward stroke of the valve piston. In addition, due to the positioning of the valves on the concrete pump, the access to the tightening means for expanding the seal on such valves is somewhat awkward, which also makes difficult the task of disassembly for replacement of worn parts, such as the piston cylinder which is very susceptible to wear and must often be replaced.

SUMMARY OF THE INVENTION

Briefly, the invention comprises a concrete pump valve having a front valve closing portion to prevent flow through a T-pipe section and a support structure which is out of frictional contact with the closing portion and an annular valve sealing, carried by the structure which prevents any flow rearward of the closing portion. Externally accessable tightening means are provided for maintaining the proper pressure of the seal against the closing means.

It is therefore the principal object of this invention to provide a concrete pump valve which has a longer trouble-free life than valves available heretofore.

It is another object of this invention to provide a concrete pump valve which is more wear resistant than the valves available heretofore.

It is further object of this invention to provide a concrete pump valve which has an improved seal.

It is a still further object of this invention to provide a concrete pump valve which has improved access to the valve seal tightening means located thereon.

These and other objects and advantages of the present invention will become apparent from the following detailed description taken in conjunction with the accompanying drawings.

IN THE DRAWINGS

FIG. 1 is a plan view of a concrete pump having valves constructed in accordance with the invention.

FIG. 2 is a sectional elevation of one of the valves of the pump taken along line 2—2 in FIG. 1.

FIG. 3 is a sectional plan view of the valve showing the annular band seal and tightening means, taken along line 3—3 of FIG. 2.

FIG. 4 is a sectional view of a modification of the first embodiment of the concrete pump valve.

Figure 5:
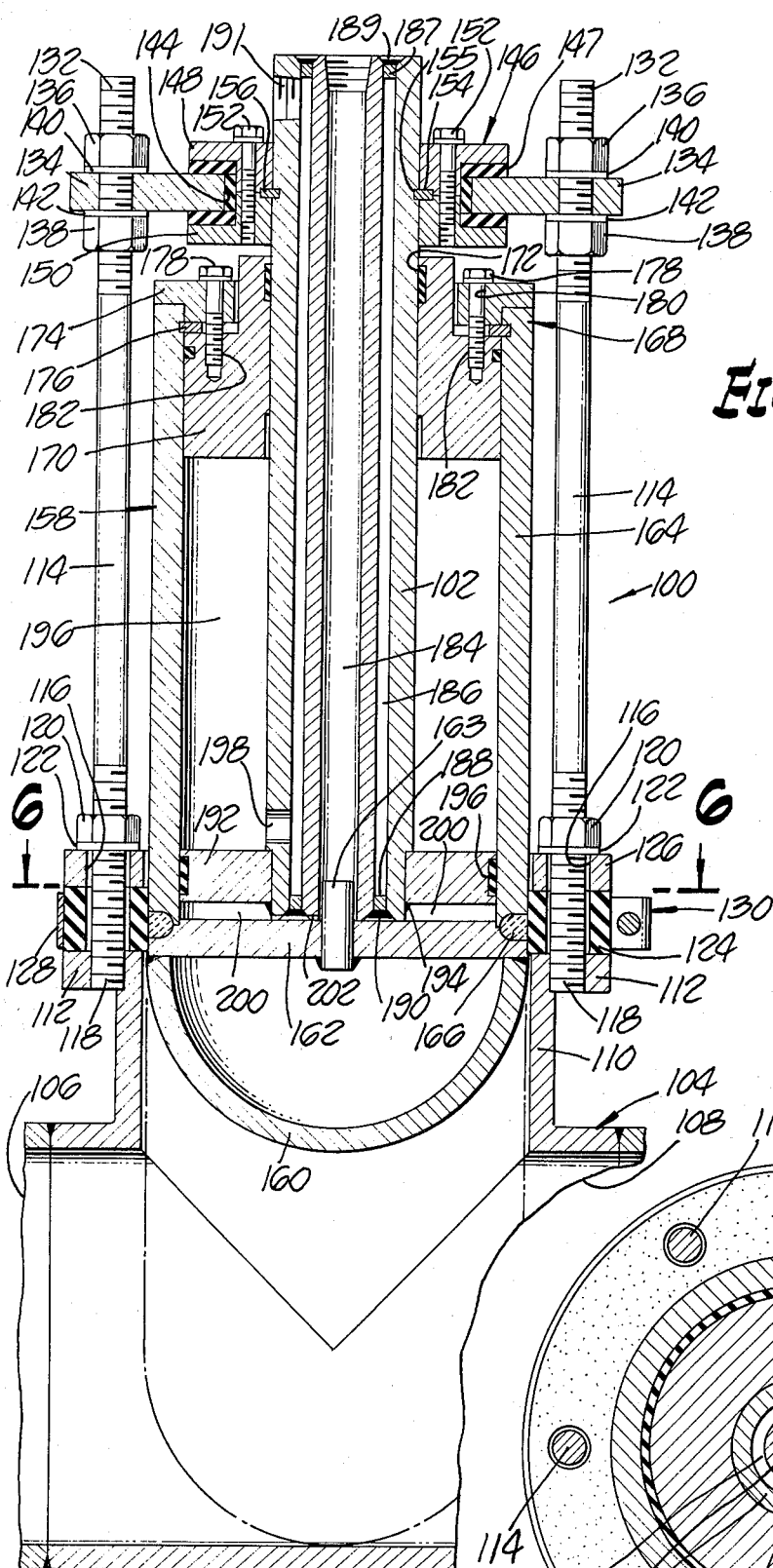
FIG. 5 is a sectional view of the second embodiment of the concrete pump valve.

Referring now in detail to the drawings, FIG. 1 illustrates a pump for moving concrete, received in a hopper 10 through an outlet 12. The pump comprises a frame 14 which carries an engine 16 and a pair of rams 18 and 20. Concrete dumped into the hopper 10 passes down through feed lines 22 and 24 to areas in front of the rams. The rams pushed this concrete toward outlet 12. The two rams operate alternatively to provide relatively continuous flow of concrete.

The concrete pump has four valves including two hopper valves, generally designated 26 and 28, and two pipeline valves, generally designated 30 and 32. As the ram 18 moves to its rearward position, the hopper valve 26 opens to allow concrete to fall into the area in front of the ram. During this time, the pipeline valve 30 is closed to prevent the backflow of concrete into the hopper. The concrete may be pumped to large heights such as several stories, and unless the pipeline valve 30 were closed, concrete would rush back through the feed line 22. When the area in front of the ram 18 is filled and the ram begins its forward stroke, the pipeline valve 30 is opened while the hopper valve 26 is closed. The other ram 20 and valves 28 and 32 operate in a similar manner but at different times.

The valves must withstand difficult operating conditions. During the forward ram stroke, the hopper valves 26 and 28 are subjected to a relatively high pressure on their downward side. The pipeline valves 30 and 32 are subjected to even more difficult operating conditions. They have a high pressure on one side during both the forward and rearward movement of the rams whose flow they control. The valves must be able to prevent excessive leakage of sap, and yet be able to withstand the highly abrasive concrete which includes sharp hard rocks.

FIG. 2 shows the detailed construction of the pipeline valve 30, which is similar to the construction of the other three valves of the concrete pump. The valve comprises a T-section 40 having an upstream end 42 adjacent to the ram and a downstream end 44 adjacent to the outlet of the pump. The T-section has a leg portion 46 which terminates in an annular flange 48. Six supporting rods 50 extend into corresponding threaded apertures 52 in the annular flange 48. The forward end 54 of each rod is threadably engaged with thread in the T-section flange and is secured thereto by a nut 56 and washer 58. Positioned between the washer 58 and flange 48 is an annular sealing member 60 and a compression plate 62, each having appropriately positioned apertures therein to allow for the passage of the support rod 50 therethrough. The sealing member 60 is constructed of a relatively pliable material such as polyurethane. A tightening band 64 is located about the annular sealing member 60 and is provided with a screw type tightening means 66 which upon rotation of the extended end 68 thereof, radially constricts the diameter of the sealing means for reasons to be discussed.

The rearward end 70 of each supporting rod 50 is threadably engaged with a supporting plate 72 and is secured thereto by a pair of nuts 74 and 76 and a washer 78. The supporting plate 72, supporting rods 50, annular seal 60 and the leg portion 46 of the T section 40 comprise a support structure for a piston assembly 80, which reciprocates within the structure to open and close the valves. The piston assembly which is comprised of a piston rod 81 and a piston head (not shown), carries includes a forward closing member 82 having a bullet shape. When the closing member is in the rearward position, as shown in FIG. 2, concrete can easily flow through the valve. When the closing member 82 is in the forward position concrete cannot pass between the ends 42 and 44 of the T section. The exact position of the closing member in forward position is adjustable by nuts 74 and 76 to continually provide a tight seal which otherwise might be lost due to frictional wear on the nose of the closing member. In the preferred embodiment of the invention, the forward closing member is a hollow steel member, as shown in the drawings. A hydraulic cylinder 84 is disposed about the upper portion of the piston assembly for driving the assembly between its two positions. A locking bar 87 is provided to strengthen the juncture of the piston rod and the forward closing member and prevent any movement therebetween. A locking bar 87 is provided to strengthen the juncture of the plunger and forward closing end of the piston and to prevent any relative movement therebetween.

It can be seen from FIG. 2, that as piston assembly 80 reciprocates, it is in fact supported by the leg portion 46 of the T section, the annular seal 60 and the supporting plate 72, all of which are held together by the supporting rods 50. This supporting structure eliminates the need for piston cylinder walls which normally receive a great deal of wear and require replacement after a period of use. In addition, the sealing member 60, by virtue of its annular construction and mounting in an external supporting assembly, provides easy access to the valve for cleaning and maintenance. The elimination of the cylinder wall and internal seals allows gravity cleanout to be employed while washing down the valves, thereby eliminating the necessity of disassembling the valve for a thorough cleaning thereof. Also the annular seal 60 provides increased protection against sap leakage past the closing member 82 due to its durability and adjustability. The annular seal is very durable as it is not forced to undergo damaging deformation during the reciprocating movement of the piston as is the case with other concrete valve seals. After a period of usage, however, some adjustment of the seal becomes necessary as a result of wear. The necessary adjustment is simply accomplished by loosening nuts 56 above the compression plate 62, tightening the band 64 about the sealing means and retightening nuts 56, thereby uniformly compressing the annular sealing means about the forward closing portion 82 of the piston assembly. This uniform compression caused by the pressure of both the tightening band 64 and the compression plate 62 against the seal creates an improved seal about the piston and further helps to prolong the life of the seal by eliminating some of the internal stress within the seal which might otherwise be caused by compression in a single direction with restricted side expansion. It should also be noted that this adjustment is easily accomplished due to the accessibility of the different parts involved and the lack of the necessity of disassembly which is required with the valves currently available.

A modification of the first embodiment of the invention is shown in FIG. 4. The modifications shown therein strengthen the support structure and eliminate the possibility of seal damage caused by over exertion of pressure on the seal by the compression plate. To accomplish these objectives, a plurality of shims 86 are placed about each supporting rod 50 below the support plate 72. A spacer 88 is placed about each supporting rod between shims 86 and a retaining plate 90, adding additional stability to the support structure. Retaining plate 90 is identical to the compression plate 62 of the first embodiment, except for friction, as will become apparent. A short spacer 92 is also positioned about each supporting rod between the retaining plate and the annular flange 48 of the T-section 40. The forward ends 54 of supporting rods 50 in the modified valve of FIG. 4, as FIG. 2, are in threaded engagement with flange 48. The sealing member 60 and tightening band 64 are also unchanged in the modified valve, except that the apertures in the sealing member may be slightly larger in diameter to accommodate the short spacers 92.

In use, the modified valve of FIG. 4 is adjusted to compensate for wear on the closing member 82, by adjustment of the shims 86 and tightening of nuts 74. The compression of the seal 60, in this embodiment, is entirely accomplished through radial compression of the seal by the tightening band 64. This eliminates the possibility of seal damage which can result from over exertion of vertical pressure on the seal by the compression plate, and is quite useful in situations where the necessary care in handling the compression plate may not be used.

Figure 6:
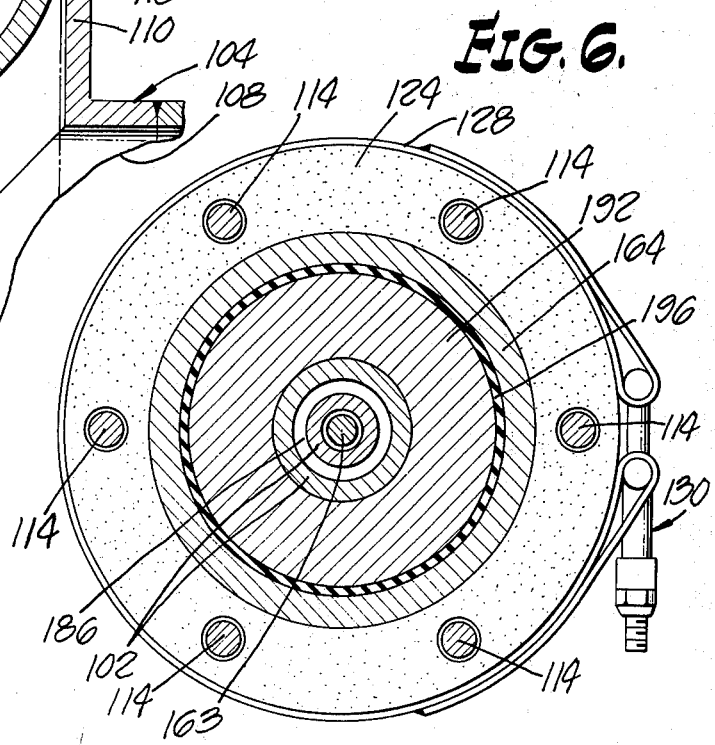
FIG. 6 is a sectional plan view of the second embodiment showing the annular band seal and tightening means as seen from line 6—6 in FIG. 5.

A third embodiment of the invention is shown in FIGS. 5 and 6. In this embodiment, the concrete valve 100 is provided with a piston rod 102. As valve 30, valve 100 is comprised of a T section 104 having an upstream end 106, a downstream end 108 and a leg portion 110 terminating in an annular flange 112. Six supporting rods 114 pass through corresponding apertures 116 in the compression plate 126 and extend into the annular flange 112, where the forward end 118 of each rod is threadably engaged with threads in the T section flange and is secured thereto by a nut 120. Positioned between the washer 122 and flange 112 is an annular sealing member 124, constructed of polyurethane or similar material, and a compression plate 126, each being secured as in the first embodiment. A tightening band 128 is positioned about the annular sealing member 124 and is provided with tightening means 130, also the same as in the first embodiment.

The rearward end 132 of each supporting rod 114 is threadably engaged with an annular supporting plate 134 and is secured thereto by a pair of nuts 136 and 138 and lock washers 140 and 142. Supporting plate 134 has a central aperture therein defining an inner circular edge 144. Positioned around the inner edge of the supporting plate and extending about a portion thereof is a piston support bracket 146. Sealing members 147 are provided as an interface between the support bracket and supporting plate, giving the structure a degree of flexibility and tending to reduce vibration between the two supporting members. The piston support bracket is comprised of a pair of annular flange members 148 and 150. The two flange members are held together by a plurality of screws 152. The upper flange member 148 has a plurality of apertures therein for screws 152 to pass through and the lower flange member 150 has a corresponding number of tapped apertures allowing screws 152 to threadably engage the lower flange member 150 thereby holding the two flange portions together. The annular area defined by the two flange members thus fits about the sealing members 147 and the inner portion of the supporting plate 134 and is firmly held thereto by screws 152. Each of the two flange portions has an annular cut 154 at the inner edge thereof adapted to receive a portion of a split ring 156. The piston rod 102 has a corresponding cut 155 therein adapted to receive the remainder of the split ring, thereby increasing the supporting strength of the support bracket on the hydraulic cylinder.

It can be seen from FIG. 5 that the supporting brackets 146, plate 134, rods 114, annular seal 124 and the leg portion 110 of the T section comprise an external valve support structure for a reciprocating hydraulic cylindrical closing member 158 which moves about the piston rod 102 and acts to open and close the valve. As in the prior embodiment, when the closing member is in the rearward position, as shown in FIG. 5, concrete can easily flow through the valve. When the closing member is in the forward position, concrete cannot pass between the ends 106 and 108 of the T section. In the preferred embodiment of the valve 100, the closing member has a rounded forward hollow steel portion 160 as shown in the drawing. In addition to the forward hollow portion 160, the cylindrical closing member 158 has a base plate 162 with an orifice restricting member 163 centrally positioned therein and extending rearwardly of the base plate and into the piston rod 102. The orifice restricting member dampens the force of the closing member against the forward end of the piston rod during the return stroke, thereby reducing wear and tending to prevent damage to the valve which might otherwise result. The base plate is affixed to the closing member and is welded to the cylindrical wall portion 164 of the closing member at 166. A rearward support and guide assembly, generally designated 168, supports the rearward portion of the closing member about the piston rod 102 and guides the closing member along the piston rod during its reciprocating movement. The rear assembly 168 is comprised of a guiding block 170 which has a central aperture therethrough and is adapted to fit about the piston rod 102 and move there along. An annular sealing member 172 is positioned in a cutout section of the guiding block to provide a seal between the block and the piston rod as the block moves with the closing member along the piston rod. The block 170 is joined to the cylindrical wall portion 164 by an annular flange member 174, split ring 176 and screws 178 which extend through apertures 180 drilled in the annular flange 174 and into the tapped apertures 182 in the guiding block 170 for threaded engagement therewith. The guide and support assembly 168, cylinder wall 164, base 162 and forward closing portion 160 thus form the cylindrical closing member 158 which reciprocates within the external valve support structure and about the piston rod 102.

The piston rod has a central channel 184 extending therethrough and an annular channel 186 positioned about the central channel and extending substantially through the piston. Annular channel 186 terminates at its upper end in a ring 187 which is welded at 189 to the rearward most portion of the piston rod 102 thereby sealing the channel at its rearward end. A similar ring 188 is positioned in the forward most portion of annular channel 186 and is welded to the piston at 190 thereby sealing the channel at its forward end. An opening 191 is located in the side of the rearward position of the piston rod 102 to provide access to the annular channel 186. A forward annular piston head 192 is welded to the forward end of the piston rod at 194. And provided with an annular sealing 196 about its outer edge, thereby forming a seal at the interface between the piston head 192 and the cylinder wall 164 as the wall reciprocates along the head. During this reciprocating movement of the closing member about the piston rod and within the valve structure, it can be seen from FIG. 5 that while the rearward portion of the closing member is held and guided by the rearward assembly 168, bearing against the piston rod, the forward portion of the closing member is held and guided between the piston plate 192 and the annular sealing member 124 and leg portion 110 of the T section. This structure, as the structure in the first embodiment, eliminates the need for an external cylinder wall which would be in continual sliding contact with a piston and thereby provides an excellent seal to protect against sap leakage past the closing member 158.

The piston rod 102, cylindrical wall 164, guiding block 170 and forward piston plate 192 define an annular chamber 196 which communicates with the annular channel 186 through an opening 198 in the piston. The forward end of the cylinder wall 164, base plate 162 and piston rod 102 define a second forward chamber 200 which communicates with central channel 184 through an opening 202 in the forwardmost end of the piston. In operation, hydraulic fluid abuts the restricting member 163 which is affixed to the base plate 162. Some of the fluid passes around the restricting member, through openings 202 and into the forward chamber 200. As the fluid abuts the restricting member and fills the forward chamber, the closing member is driven forward along the piston by the force of both the fluid pushing against the restricting member and the pressure developed within the forward chamber which push against the stationary piston head 192. These combined hydraulic forces drive the closing member forward to the point where the forward closing portion 160 abuts the T-pipe section and the concrete flow therethrough is shut off. It should be understood that when the closing member is in this forward position, the base plate 162 is forwardly disposed with respect to the piston head 192, whereby the forward chamber has greatly increased in size and is capable of maintaining the amount of hydraulic fluid necessary to drive the closing member to its forwardmost position. The rearward annular chamber 196 is, of course, being reduced in size during the forward movement of the closing member due to the forward movement of the rearward guide and support assembly 168 with respect to the stationary forward piston head 192. To effectuate the opening of the valve through the rearward movement of the closing member, hydraulic fluid is pumped down the annular channel 186 through opening 191 where it enters the annular chamber 196 through opening 198. As the hydraulic fluid enters the compressed annular chamber 196, it causes the expansion of the chamber by forcing the rearward support assembly 168 in the rearward direction thereby retracting the closing member which is carried by the rearward movement of the support assembly. As the annular chamber 196 expands, the forward chamber 200 correspondingly reduces in size, driving the fluid therein back out the central channel 184 in the piston. By thus regulating the alternate forced flow of hydraulic fluid into and out of channels 184 and 186, the movement of the closing member can be easily controlled and the flow of concrete through the T-pipe section rapidly regulated.

Figure 7:
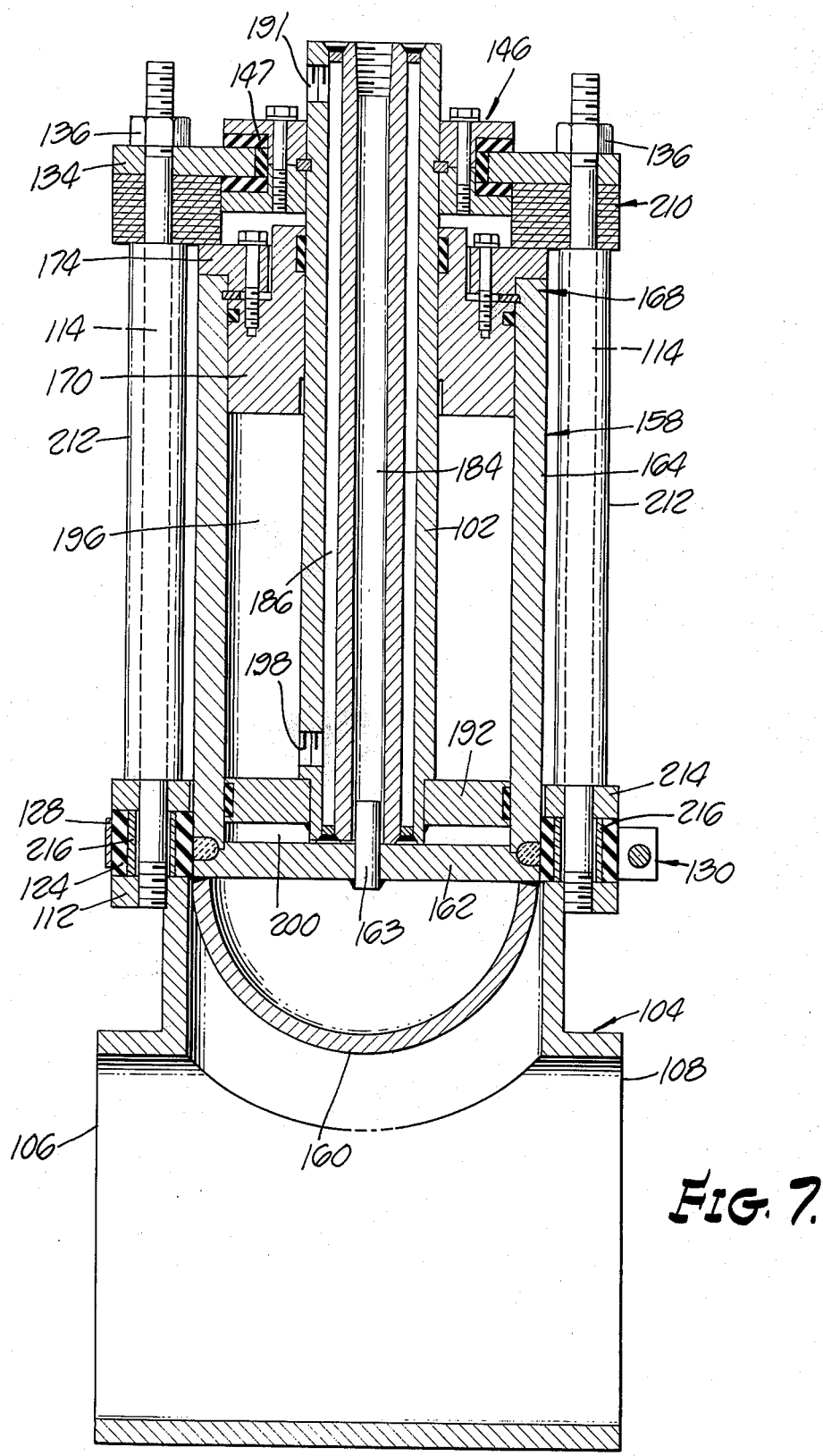
FIG. 7 is a sectional view of a modification of the second embodiment of the concrete pump valve.

FIG. 7 illustrates a modification of the second embodiment of the invention. The modified valve shown herein incorporates the same changes illustrated in FIG. 4 with respect to the embodiment. Shims 210 are positioned about supporting rods 114 under supporting plate 134. Spacers 212 are disposed about each supporting rod and extend between the shims 210 and a retaining plate 214. A short spacer 216 is also positioned about each supporting rod between the retaining plate and the annular flange 112 of the T-section 104. Again the closing member 158 is adjusted to compensate for wear by adjustment of the shims 210 and tightening of nuts 136. The compression of the annular sealing member 124 is accomplished solely through radial compression by means of tightening band 128.

Various changes and modifications may be made in carrying out the present invention without parting from the spirit and scope thereof. Insofar as these changes and modifications are within the purview of the appended claims, they are to be considered as part of the invention.

What is claimed is:

1. A valve comprising a supporting structure, a piston assembly having a closing member at the forward end thereof, said piston assembly being carried by said supporting structure and adapted for reciprocal movement therein, an annular sealing member carried by said supporting structure and supporting said closing member, said sealing member defining inner and outer wall portions, said inner wall portion being positioned about and in sealing engagement with said closing member, an annular band positioned about said outer wall portion of said sealing member and means carried by said band for tightening said band about said outer wall portion of said annular sealing member whereby said inner wall portion of said sealing member is radially pressed against said closing member.

2. The combination of claim 1 wherein said support structure is comprised of a rear support member and a plurality of supporting rods, said rods being secured at one end thereof to said support member and extending in substantially parallel relation to said closing member and being disposed outwardly therefrom, the other end of each of said rods extending through said sealing member and holding said sealing member about said closing member.

3. The combination of claim 2 wherein said supporting structure includes a pair of retaining members, said members abutting opposite sides of said sealing member to prevent axial movement thereof, said other ends of said supporting rods extending through one of said retaining members and being secured to the other of said retaining members.

4. In a valve having a T section with a cross portion through which material flows and a leg portion within which a piston reciprocates to control flow through said cross portion, the improvement comprising a supporting structure for carrying said piston, a closing member disposed at the forward end of said piston, said structure being positioned about said piston and said closing member, radially disposed therefrom and defining an area which communicates with the leg portion of said T section and within which said piston and said closing member undergoes reciprocal movement; an annular sealing member carried by said supporting structure and supporting said closing member, said sealing member defining inner and outer wall portions, said inner wall portion being positioned about and in sealing engagement with said closing member, an annular band positioned about said outer wall portion of said sealing member and means carried by said band for tightening said band about said outer wall portion of said annular sealing member whereby said inner wall portion of said sealing member is radially pressed against said closing member.

5. The combination of claim 4 wherein said supporting structure includes a pair of retaining members, said members abutting opposite sides of said sealing member to prevent axial movement thereof, said other ends of said supporting rods extending through one of said retaining members and being secured to the other of said retaining members.

6. The combination of claim 4 including a plurality of shim means carried by said supporting structure, a seal retaining member adjacent said sealing means, means carried by said supporting structure for spacing said shims from said retaining member and means carried by said supporting structure for spacing said retaining member from said T section.

7. In a valve having a T section with a cross portion through which material flows and a leg portion terminating in an external annular flange and within which a piston reciprocates to control flow through said cross portion, the improvement comprising; a supporting structure for carrying said piston, a closing member disposed at the forward end of said piston, said structure being comprised of a rear support member and a plurality of supporting rods, said rods being secured at one end thereof to said support member, extending in substantially parallel relation to said piston and said closing member and raidally disposed therefrom the other ends of said supporting rods being adapted for threaded engagement with said annular flange on said leg portion whereby said supporting structure defines an area which communicates with the leg portion of said T section and within which said piston and closing member undergo reciprocal movement; an annular sealing member defining inner and outer wall portions, said sealing member being positioned on said annular flange of said leg portion and said supporting rods of said support structure extending through said sealing member and holding said sealing member about said closing member, an annular band positioned about the outer wall portion of said sealing member and means carried by said band for tightening said band about said outer wall portion of said annular sealing member whereby said inner wall portion of said sealing member is radially pressed against said closing member.

8. In a valve having a T section with a cross portion through which material flows and a leg portion within which a piston reciprocates to control flow through said cross portion, the improvement comprising a supporting structure for carrying said piston, a closing member disposed at the forward end of said piston, said structure being comprised of a rear support member and a plurality of supporting rods, said rods being secured at one end thereof to said supporting member; extending in substantially parallel relation to said piston and said closing member, disposed outwardly therefrom and defining an area which communicates with the leg portion of said T section and within which said piston and closing member undergo reciprocal movement; a sealing member carried by said supporting structure and positioned about said closing member and in contact therewith, the other end of each of said rods extending through said sealing member and holding said sealing member about said closing member; means for radially pressing said sealing member against said piston; a plurality of shim means disposed about each of said supporting rods forwardly of said support member; a seal retaining member adjacent said sealing member; means carried by said supporting structure for spacing said shim means from said retaining member and means carried by said supporting structure for spacing said retaining member from said T section.

9. The improvement of claim 8 wherein said sealing means is of an annular configuration defining a body member having an inner wall portion and an outer wall portion, said inner wall portion being positioned externally adjacent said piston sealing engagement therewith and supporting the forward portion of said piston.

10. The improvement of claim 9 wherein said pressing means comprises an annular band positioned about the outer wall portion of said sealing member and means for tightening said band about said sealing member.

11. In a valve having a T section with a cross portion through which material flows and a leg portion terminating in an external annular flange and within which a piston reciprocates to control flow through said cross portion, the improvement comprising: a supporting structure for carrying said piston, said structure being comprised of a rear support member and a plurality of supporting rods, the rearward end of each of said rods extending through said support member and having threaded fastening means secured thereto, said rods extending from said support member in substantially parallel relation to said piston and radially disposed therefrom, the forwardly extending ends of said rods being adapted for threaded engagement with said annular flange on said leg portion whereby said supporting structure defines an area which communicates with the leg portion of said T section and within which said piston undergoes reciprocal movement; an annular sealing means defining a body member having an inner wall portion and an outer wall portion, said sealing means being positioned on said annular flange of said leg portion and said supporting rods of said support structure extending through said body member of said sealing means holding said sealing means about said piston; a plurality of shim means disposed about each of said supporting rods forwardly of said support member; an annular retaining plate adjacent said annular sealing means and having apertures therein for the passage of said supporting rods therethrough; a plurality of tubular members, one of said members being disposed about each of said supporting rods and extending between said shims and said annular retaining plate; a second plurality of tubular members, one of said second plurality being disposed about each of said supporting rods and extending between said retaining plate and said annular flange of said T section; an annular band positioned about the outer wall portion of said sealing means and means for tightening said band about said sealing means.

12. A valve comprising a support structure, a piston rod carried by said support structure, a closing member disposed about and carried by said piston rod and being adapted for reciprocal movement with respect thereto, means for reciprocating said closing member about said piston rod, an annular sealing member carried by said supporting structure and positioned about said closing member and in sealing engagement therewith, an annular band positioned about said sealing member and means carried by said band for tightening said band about said annular sealing member whereby said sealing member is pressed against said closing member.

13. The combination of claim 12 wherein said reciprocating means comprises at least one longitudinal channel disposed in said piston rod such that upon directing fluid through said channel, said closing member is driven forward of said piston rod and support structure.

14. The combination of claim 13 wherein said support structure is comprised of a support bracket, said bracket being secured to said piston rod, a support member carried by said bracket and a plurality of supporting rods, said rods being secured at one end thereof to said support member and extending in substantially parallel relation to said closing member and disposed outwardly therefrom, the other end of each of said rods extending through said sealing member and holding said sealing member about said cylinder.

15. The combination of claim 12 including a plurality of chambers within said closing member and a plurality of channels disposed within said piston rod, said channels communicating with said chambers so that upon pumping fluid into one of said chambers through one of said channels, said closing member is driven in the forward direction and upon pumping the fluid into a second chamber within said piston rod through a second channel, said closing member is driven in the rearward direction.

16. A valve comprising a supporting structure, a piston rod carried by said supporting structure and having a pair of channels therein, a closing member being positioned within said supporting structure and about said piston rod, said closing member being carried by said supporting structure and said piston rod being adapted for reciprocal movement with respect to said supporting structure and with respect to and about said piston rod, and a piston head being positioned within said closing member and carried by said piston rod, said closing member, piston head and piston rod defining a forward chamber and rearward chamber within said closing member, each of said chambers communicating with one of said channels in said piston rod such that upon pumping fluid into said forward chamber through one of said channels of said closing member is driven in the forward direction, and upon pumping fluid into said rearward chamber through the other of said channels said cylinder is driven in the rearward direction, an annular sealing member being carried by said supporting structure and positioned about said closing member and in contact therewith and means for pressing said sealing member against said closing member.

17. The combination of claim 16 wherein said support structure is comprised of a support bracket, said bracket being secured to said piston rod, a support member carried by said bracket and a plurality of supporting rods, said rods being secured at one end thereof to said support member and extending in substantially parallel relation to said closing member and disposed outwardly therefrom, the other end of each of said rods extending through said sealing member and holding said sealing member about said closing member.

18. In a valve having a T section with a cross portion through which material flows and a leg portion within which a member reciprocates to control flow through said cross portion, the improvement comprising a supporting structure, a piston rod carried by said supporting structure and having a pair of channels therein, a closing member being positioned within said supporting structure and about said piston rod, said closing member being carried by said supporting structure and said piston rod and being adapted for reciprocal movement with respect to said supporting structure and with respect to and about said piston rod, an annular sealing member being carried by said supporting structure and positioned about said closing member and in sealing engagement therewith and means for pressing said sealing member against said closing member.

19. The improvement of claim 18 wherein said support structure is comprised of a support bracket, said bracket being secured to said piston rod, a support member carried by said bracket and a plurality of supporting rods, said rods being secured at one end thereof to said support member and extending in substantially parallel relation to said closing member and disposed outwardly therefrom, the other end of said rods extending through said sealing member and holding said sealing member about said closing member.

20. The improvement of claim 19 including a plurality of shim means disposed about each of said supporting rods forwardly of said support member, a seal retaining member adjacent sealing member, means for spacing said shims from said retaining member and means for spacing said retaining member from said T section.

21. The improvement of claim 20 wherein said pressing means comprises an annular band positioned about said sealing member and means for tightening said band about said annular sealing member.

22. The combination of claim 18 including a plurality of chambers within said closing member and a plurality of channels disposed within said piston rod, said channels communicating with said chambers such that upon pumping fluid into one of said chambers through one of said channels, said closing member is driven in the forward direction and upon pumping the fluid into a second chamber within said piston rod through a second channel, said closing member is driven in the rearward direction.

23. In a valve having a T section with a cross portion through which material flows and a leg portion within which a member reciprocates to control flow through said cross portion, the improvement comprising: a closing member, supporting structure positioned about said closing member radially disposed therefrom and defining an area which communicates with the leg portion of said T section and within which said closing member undergoes reciprocal movement; a piston rod having a pair of channels therein, said piston rod being carried by said supporting structure and centrally disposed with respect to said closing member and extending therethrough such that said closing member reciprocates about said piston rod and with respect thereto; a piston head being positioned within said closing member and carried by said piston rod, said closing member, piston head and piston rod defining a forward chamber and a rearward chamber within said closing member, each of said chambers communicating with one of said channels in said piston rod such that upon pumping fluid into the forward chamber within said closing member through one of said channels in said piston rod, said closing member is driven in a forward direction and upon pumping fluid into the rearward chamber within said closing member through the other of said channels, said closing member is driven in the rearward direction; an annular sealing member defining an inner wall portion and an outer wall portion, said sealing member being positioned between said supporting structure and the leg portion of said T section, said inner wall portion of said sealing member being externally adjacent said closing member and in sealing engagement therewith; an annular band positioned about the outer wall portion of said sealing member; and means for tightening said band about said sealing member.

24. The improvement of claim 23 wherein one of said channels in said piston rod is centrally disposed with respect to said closing member and extends therethrough, communicating with said forwardly disposed chamber in said piston rod and said second channel is of annular configuration and positioned about said first channel and communicating with said rearwardly disposed chamber with said piston rod, an aperture being provided in the side of said second channel to communicate said annular channel with said rearwardly disposed chamber.

25. The improvement of claim 24 wherein said support structure is comprised of a support bracket being secured to said piston rod, a support member carried by said bracket and a plurality of supporting rods, said rods being secured at one end thereof to said support member and extending in substantially parallel relation to said closing member and disposed outwardly therefrom, the other end of each of said rods extending through said sealing member holding said sealing member about said closing member and being in threaded engagement with said annular flange on said leg portion.

26. The improvement of claim 25 including a plurality of shim means disposed about each of said supporting rods forwardly of said support member, a seal retaining member adjacent sealing means, means for spacing said shims from said retaining member and means for spacing said retaining member from said T section.

27. In a valve having a T section through which material flows and a leg portion within which a member reciprocates to control flow through said cross portion, the improvement comprising a supporting structure, a piston rod carried by said supporting structure and having a pair of channels therein, a closing member being positioned within said supporting structure and about said piston rod, said closing member being carried by said supporting structure and said piston rod and being adapted for reciprocal movement with respect to said supporting structure and about and with respect to said piston rod, a sealing member carried by said supporting structure and positioned about said cylinder and in sealing engagement therewith, means for pressing said sealing member against said cylinder, a plurality of shim means carried by said supporting structure, a seal retaining member adjacent said sealing member, means for spacing said shims for said retaining member and means for spacing said retaining member from said T section.

* * * * *